(12) United States Patent
An (10) Patent No.: US 12,092,225 B2
(45) Date of Patent: Sep. 17, 2024

(54) BUTTERFLY VALVE WITH QUINTUPLE OFFSET STRUCTURE

(71) Applicant: KOREA UNICOM VALVE CO., LTD, Namdong-gu (KR)

(72) Inventor: Ilho An, Anseong-si (KR)

(73) Assignee: KOREA UNICOM VALVE CO., LTD (KR)

(*) Notice: Subject to any disclaimer, the term of this patent is extended or adjusted under 35 U.S.C. 154(b) by 0 days.

(21) Appl. No.: 17/801,710

(22) PCT Filed: Aug. 26, 2021

(86) PCT No.: PCT/KR2021/011488
§ 371 (c)(1),
(2) Date: Aug. 23, 2022

(87) PCT Pub. No.: WO2022/124527
PCT Pub. Date: Jun. 16, 2022

(65) Prior Publication Data
US 2023/0332691 A1    Oct. 19, 2023

(30) Foreign Application Priority Data
Dec. 10, 2020 (KR) ................ 10-2020-0172273

(51) Int. Cl.
*F16K 1/22* (2006.01)
*F16K 1/226* (2006.01)
*F16K 1/46* (2006.01)

(52) U.S. Cl.
CPC ............ *F16K 1/222* (2013.01); *F16K 1/2263* (2013.01); *F16K 1/465* (2013.01)

(58) Field of Classification Search
CPC .......... F16K 1/222; F16K 1/2263; F16K 1/465
USPC ............................ 251/298, 305–308
See application file for complete search history.

(56) References Cited

U.S. PATENT DOCUMENTS

| | | | | |
|---|---|---|---|---|
| 4,284,264 | A | * | 8/1981 | Hubertson ............ F16K 1/2263 251/305 |
| 4,480,815 | A | * | 11/1984 | Kreij ...................... F16K 1/222 251/298 |
| 4,601,459 | A | * | 7/1986 | Verdelet .................. F16K 1/226 251/305 |

(Continued)

FOREIGN PATENT DOCUMENTS

CN  201973255 U  *  9/2011
CN  103759025 A  *  4/2014
(Continued)

OTHER PUBLICATIONS

European Patent Office; Search Report in related International Patent Application No. PCT/KR2021/011488 dated Nov. 24, 2021; 2 pages.

*Primary Examiner* — John Bastianelli
(74) *Attorney, Agent, or Firm* — Dorton & Willis, LLP (57) ABSTRACT

A butterfly valve having a quintuple offset structure includes a valve body having a flow path formed therein and provided to connect neighboring pipes; a seat coupled to an inner surface of the valve body; and a disk including a disc body provided to open or close the flow path. A hinge coupling part is formed on one surface of the disk body and coupled with a rotation shaft which hinge-couples the disk body and the valve body so that the disk body is rotatable to the valve body.

6 Claims, 4 Drawing Sheets

(56) References Cited

U.S. PATENT DOCUMENTS

| | | | | |
|---|---|---|---|---|
| 4,770,393 | A * | 9/1988 | Hubertson | F16K 1/2263 |
| | | | | 251/305 |
| 6,702,257 | B1 * | 3/2004 | Mollmann | F16L 55/10 |
| | | | | 251/305 |
| 7,264,224 | B1 * | 9/2007 | Weston | F16K 27/0209 |
| | | | | 261/DIG. 12 |
| 8,727,313 | B2 * | 5/2014 | Fan | F16K 1/226 |
| | | | | 251/368 |
| 8,944,407 | B2 * | 2/2015 | Kurihara | F16K 1/222 |
| | | | | 251/307 |
| 9,995,398 | B2 * | 6/2018 | Misumi | F16K 1/2014 |
| 2020/0072360 | A1 * | 3/2020 | Xie | F16K 1/222 |
| 2021/0054939 | A1 * | 2/2021 | Kamppila | F16K 1/226 |

FOREIGN PATENT DOCUMENTS

| | | | | |
|---|---|---|---|---|
| CN | 104048054 | A | * | 9/2014 |
| CN | 108953628 | A | * | 12/2018 |
| EP | 3581833 | A1 | * | 12/2019 |
| KR | 10-2001-0083445 | A | | 9/2001 |
| KR | 10-2010-0067216 | A | | 6/2010 |
| KR | 10-2012-0132810 | A | | 12/2012 |
| KR | 10-2016-0074192 | A | | 6/2016 |
| KR | 10-2268251 | B1 | | 6/2021 |
| WO | WO-2019211505 | A1 | * | 11/2019 |

* cited by examiner

BUTTERFLY VALVE WITH QUINTUPLE OFFSET STRUCTURE

CROSS-REFERENCE TO RELATED APPLICATIONS

This application is a national phase application under 35 U.S.C. § 371 of International Patent Application No. PCT/KR2021/011488, filed Aug. 26, 2021 (pending), which claims the benefit of priority to Korean Patent Application No. 10-2020-0172273, filed Dec. 10, 2020, the disclosures of which are incorporated by reference herein in their entirety.

TECHNICAL FIELD

The present invention relates to a butterfly valve having a quintuple offset structure, and more particularly, to a butterfly valve having a quintuple offset structure with improved wear resistance by reducing friction between a disk and a seat when the disk is rotated for opening and closing a flow path.

BACKGROUND

A butterfly valve refers to a valve in which a flow path inside a valve body is opened and closed through a disk rotated by a shaft.

The butterfly valve may be subdivided into a central type in which the center of rotation coincides with the center of the valve, and an eccentric type in which the center of rotation is eccentric from the center of the valve.

In the case of the central type, the structure is simple and it is easy to manufacture a central type butterfly valve, but since abrasion due to friction between the disk and the seat is severe and it is disadvantageous to reduce the torque of the disk, an eccentric type butterfly valve has mainly been used in recent years.

Among the eccentric type butterfly valves, there are a double eccentric type in which the disc is eccentric with respect to the center of the valve body and the shaft is eccentric with respect to the center of the flow path, and a triple eccentric type in which the center of the disk and a seat surface is formed on a virtual conical surface inclined with respect to the flow path center in addition to the double eccentric type.

The triple eccentric type butterfly valve is provided to be operated so that the disk and the seat do not contact each other at the intermediate opening degree during the valve operation, and contact only at the last shutoff, so that the opening/closing operation is smoother and the airtight effect is superior compared to the double eccentric type in which the disc and the seat are in contact at an intermediate opening degree.

However, even with the triple eccentric type butterfly valve as described above, it was not possible to completely prevent contact between the disk and the seat while the valve was opened. In addition, the disc of the butterfly valve manufactured as the triple eccentric type was manufactured in the form of an oval rather than a shape of a full circle.

When the disk is manufactured in an elliptical shape, it is necessary to increase the contact area between the disk and the seat, which increases pressure concentration and causes problems, such as water leakage, due to deformation.

SUMMARY

An object of the present invention is to provide a butterfly valve having a quintuple offset structure with improved wear resistance by reducing friction between a disk and a seat when the disk is rotated for opening and closing a flow path.

An exemplary embodiment of the present invention provides a butterfly valve having a quintuple offset structure, the butterfly valve including: a valve body having a flow path formed therein and provided to connect neighboring pipes; a seat coupled to an inner surface of the valve body; and a disk including a disc body provided to open or close the flow path, and a hinge coupling part formed on one surface of the disk body and coupled with a rotation shaft which hinge-couples the disk body and the valve body so that the disk body is rotatable to the valve body, in which when viewed in a plan view, in the disk, a virtual line A-A' that is parallel to the disk body and crosses a center $c_1$ of the hinge coupling part is spaced apart from a virtual line B-B' crossing a center of a thickness of the disk body by a first set distance $L_1$, a virtual line C-C' that is parallel to a direction of the flow path and crosses the center $c_1$ of the hinge coupling part is spaced apart from a virtual line D-D' that is parallel to a direction of the flow path and crosses the center of the disk body by a second set distance $L_2$, a first virtual cone vertex extending from an outer surface of the disc body that is in contact with the seat and having a set cone angle $a_1$ is eccentric to a position spaced apart from the virtual line D-D' by a third set distance $L_3$, and the first set distance $L_1$ and the second set distance $L_2$ are set so that a first angle $a_2$ formed between the virtual line A-A' and a virtual line connecting the center $C_1$ of the hinge coupling part and a point at which a diameter of a cross section intersecting a longitudinal direction of the flow path among side surfaces of the disk body is the minimum and a second angle $a_3$ formed between the virtual line A-A' and a virtual line connecting the center $C_1$ of the hinge coupling part and a point at which a diameter of a cross section intersecting a longitudinal direction of the flow path among side surfaces of the disk body is the maximum are limited to a set range.

The setting range of the first angle and the second angle is 8 degrees to 20 degrees.

Further, when viewed from the front, in the disk, a point where virtual lines meet and intersect is spaced apart from a center of a cross-section having the largest diameter by a set distance $L_4$ so that a loft angle $a_4$ formed by the intersection of the virtual lines that intersect the longitudinal direction of the flow path and lead from upper and lower points of a cross-section with the largest diameter to a section with the smallest diameter becomes a set angle.

Further, the distance $L_3$ by which the first virtual cone vertex is spaced apart from the virtual line D-D' is the same as the distance $L_4$ by which the point where the virtual lines forming the loft angle $a_4$ meet and intersect is spaced apart from the center of the cross-section having the largest diameter.

Further, a horizontal distance length $L_5$ from the center $c_1$ of the hinge coupling part to the first virtual cone vertex is the same as a horizontal distance length $L_6$ from the center $c_1$ of the hinge coupling part to the second virtual cone vertex.

Further, when viewed from the side, in the disk, a second virtual cone vertex extending from an outer surface of the disk body and having a set cone angle $a_5$ is located on the same axis as the center of the cross-section having the largest diameter.

Further, the set cone angle $a_5$ of the second virtual cone is determined by the loft angle $a_4$.

The details of other exemplary embodiments are included in the detailed description and drawings.

The butterfly valve having the quintuple offset structure according to the present invention has the following effects.

First, the quintuple offset structure is applied, so that the wear resistance and durability of the butterfly valve are improved by reducing the friction between the disk and the seat while the disk is rotated to open and close the flow path of the valve.

Second, since the wear resistance of the disk and the seat is improved, there is an effect in that the torque is reduced when the disk is rotated.

Third, since the disk is formed in a shape of a full circle by the quintuple offset structure, the contact area between the disk and the seat is reduced, and the contact pressure is uniform, so that less pressure concentration is generated. Due to this, deformation of the disk or seat may be reduced and leakage may be prevented.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Hereinafter, an exemplary embodiment of the present invention will be described in detail with reference to accompanying drawings so as for those skilled in the art to easily carry out the present invention. The present invention can be implemented in various forms and is not limited to the exemplary embodiment described herein.

It should be noted that the drawings are schematic and not drawn to scale. Relative dimensions and proportions of parts in the drawings are shown exaggerated or reduced in size for clarity and convenience in the drawings, and any dimensions are illustrative only and not limiting. The same reference numerals are used to indicate like features for the same structural element or part appearing in two or more drawings.

An exemplary embodiment of the present invention specifically represents an ideal embodiment of the present invention. As a result, various modifications of the drawings are expected. Accordingly, the exemplary embodiment is not limited to a specific form of the illustrated area, and includes, for example, a shape modification by manufacturing.

A butterfly valve 100 of a quintuple offset structure according to an exemplary embodiment of the present invention includes a valve body 110, a seat 130, and a disk 150.

The valve body 110 connects a plurality of adjacent pipes (not illustrated). For example, the valve body 110 may be disposed between one pipe (not illustrated) and another adjacent pipe (not illustrated). The valve body 110 has a hollow hole (not illustrated) that penetrates in the longitudinal direction, and the hollow hole (not illustrated) serves as a flow path through which the plurality of adjacent pipes (not illustrated) communicate.

The seat 130 is coupled to an inner surface of the valve body 110. More specifically, the seat 130 is coupled to the inner surface of the valve body 110 by the hollow hole (not illustrated). The seat 130 is exemplarily formed in a ring shape having a polygonal cross section, but is not limited thereto.

The disk 150 is hinge-coupled to the valve body 110 by a rotation shaft (not illustrated) so as to be rotatable with respect to the valve body 110. The disk 150 includes a disk body 151 and a hinge coupling part 153.

The disk body 151 opens or closes the flow path formed in the valve body 110. The hinge coupling part 153 is formed to protrude from one surface of the disk body 151, and is formed with a through hole (not illustrated) penetrating along the longitudinal direction of the hinge coupling part 153 so that the hinge shaft (not illustrated) is inserted into and penetrates through the through hole.

That is, the disc body 151 is rotated by the rotation shaft that simultaneously penetrates and is inserted into the hinge coupling part 153 and the valve body 110 to open or close the flow path formed in the valve body 110.

In more detail, the disk body 151 includes a front tapered portion 151a, a sealing portion 151b, and a rear tapered portion 151c.

The disc body 151 provides watertight and airtight performance while the side surface of the sealing portion 151b is in close contact with the seat 130. As illustrated in the drawings, the side surface of the sealing portion 151b is formed in an inclined shape. This is due to the quintuple offset structure, and a detailed description will be given later.

As the side surface of the sealing portion 151b is inclined, a size of a cross section of the sealing portion 151b is not uniform, and the sealing portion 151b has the form in which the sealing portion 151b is gradually reduced from the rear to the front side thereof.

In the description of the present invention, the center of the disk body 151 described above is determined to mean the center of the cross-section having a maximum diameter among the cross-sections of the sealing portion 151b.

Figure 2:
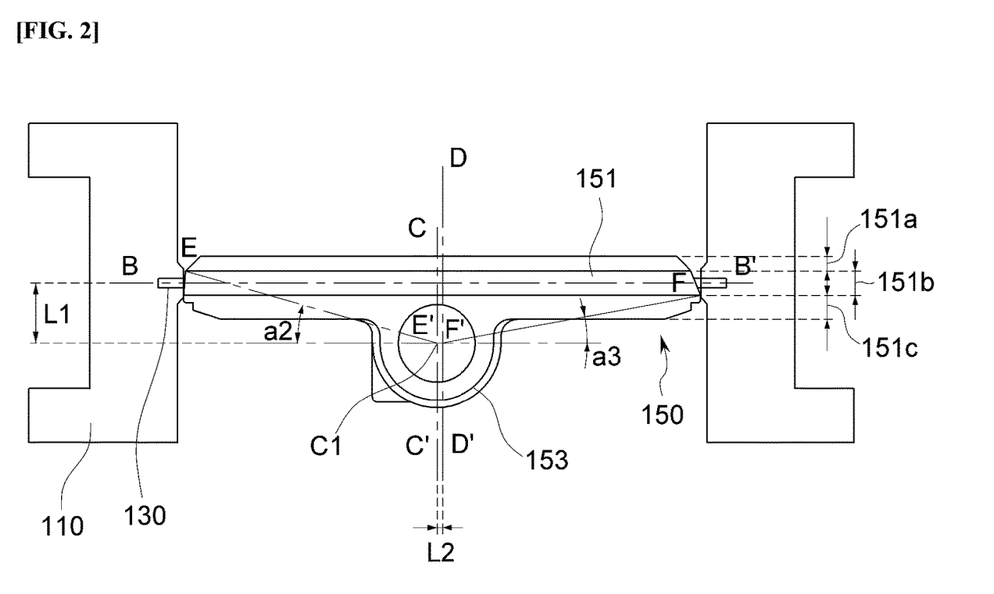
FIG. 2 is an enlarged view of a portion of the butterfly valve of FIG. 1.

The front tapered portion 151a protrudes from the front surface of the sealing portion 151b, and the side surface of the front tapered portion 151a is tapered (see FIG. 2). Due to this shape, when the disk body 151 is rotated to open and close the flow path, the side surface of the front tapered portion 151a does not come into contact with the seat 130.

The rear tapered portion 151c protrudes from the rear surface of the sealing portion 151b, and a side surface of the rear tapered portion 151c is also tapered. Similar to the front tapered portion 151a, by the shape of the rear tapered portion 151c, when the disk body 151 is rotated to open and close the flow path, the side of the rear tapered portion 151c does not come into contact with the seat 130.

On the other hand, when the disk body 151 is disposed in parallel with the flow path of the valve body 110 and closes the flow path of the valve body 110, the side surface of the disk body 151 is in close contact with the seat 130. However, friction occurs between the side surface of the disk body 151 and the seat 130 during the rotation of the disk body 151 to open the flow path of the valve body 110, so that there is a problem in that the disk body 151 and the seat 130 in convention butterfly valves are damaged by abrasion.

The butterfly valve 100 according to the exemplary embodiment of the present invention adopts the quintuple offset structure in order to prevent friction with the seat 130 while the disk body 151 is rotated and prevent abrasion and damage to the disk 150 and the seat 130.

Hereinafter, the quintuple offset structure of the butterfly valve 100 will be described in detail with reference to FIGS. 1 to 5.

Figure 1:
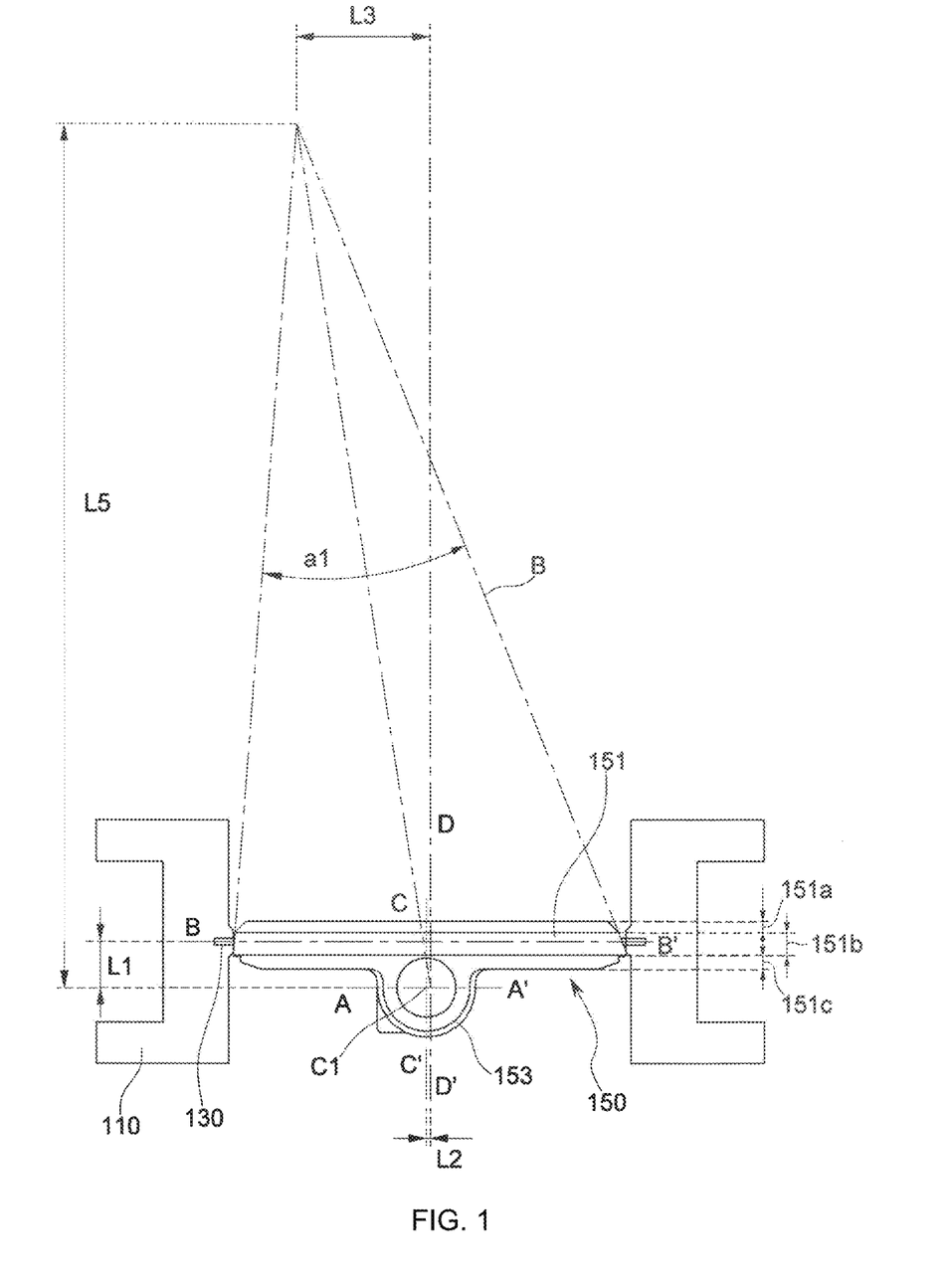
FIG. 1 is a plan view of a butterfly valve having a quintuple offset structure according to an exemplary embodiment of the present invention.

First, FIG. 1 is a top plan view of the butterfly valve 100.

A configuration for explaining the offset structure of the butterfly valve 100 will be described with reference to FIG. 1.

A line parallel to the disk body 151 and crossing the center c1 of the hinge coupling part 153 is a first virtual line A-A'.

A line crossing the center of the thickness of the disk body 151 is a second virtual line B-B'.

A line parallel to the longitudinal direction of the flow path and crossing the center c1 of the hinge coupling part 153 is a third virtual line C-C'.

A line parallel to the longitudinal direction of the flow path and crossing the center of the disk body 151 is a fourth virtual line D-D'.

Referring to FIG. 1, the first virtual line A-A' is spaced apart from the second virtual line B-B' by a set distance L1 along the direction in which the fluid flows. This is called a primary offset.

That is, a rotation shaft (not illustrated) that hinge-couples the disk 150 to the valve body 110 does not penetrate the disk body 151.

In the present invention, the hinge coupling part 153 is formed to protrude from one surface of the disk body 151 so that the rotation shaft (not illustrated) may penetrate and be inserted while being eccentric from the disk body 151.

The third virtual line C-C' is spaced apart from the fourth virtual line D-D' by a set distance L2 in a direction intersecting the direction in which the fluid flows. This is called a secondary offset.

That is, the center c1 of the hinge coupling part 153 is not coaxial with the center of the disc body 151, and the center c1 of the hinge coupling part 153 is eccentric to a position spaced apart from the center of the disk body 151 by a set distance.

Referring to FIG. 1, a first virtual cone B extending from the outer surface of the disk body 151 is illustrated. Here, the outer surface of the disk body 151 is the outer surface of the sealing portion 151b, and is the surface that is in contact with the seat 130.

In the present exemplary embodiment, a vertex of the first virtual cone B is spaced apart from the center of the disk 150 by a set distance L3 so that a cone angle of the first virtual cone B becomes a set cone angle a1. This is called a tertiary offset.

In the disk 150, the outer surface of the disk 150, that is, the surface that is in contact with the seat 130, is formed on the conical surface of the first virtual cone B by the tertiary offset.

Meanwhile, when the length L1 of the primary offset and the length L2 of the secondary offset are reduced, the valve torque is reduced. In the present invention, the primary offset length L1 and the secondary offset length L2 are selected only under the following conditions.

FIG. 2 is an enlarged view of a portion of FIG. 1. Referring to FIG. 2, a fifth virtual line E-E' and a sixth virtual line F-F' are illustrated.

The fifth virtual line E-E' is a virtual line connecting the center c1 of the hinge coupling part 153 and a side surface of a cross-section having the minimum diameter among the cross-sections of the sealing portion 151b intersecting the longitudinal direction of the flow path.

The sixth virtual line F-F' is a virtual line connecting the center c1 of the hinge coupling part 153 and a side surface of a cross-section having the maximum diameter among the cross-sections of the sealing portion 151b intersecting the longitudinal direction of the flow path.

The primary offset distance L1 and the secondary offset distance L2 are determined in consideration of a first angle a2 between the center c1 of the hinge coupling part 153 and the fifth virtual line E-E' and a second angle a3 formed by the center c1 of the hinge coupling part 153 and the sixth virtual line F-F'.

That is, the primary offset distance L1 and the secondary offset distance L2 are selected so that the first angle a1 and the second angle a2 are within a set range.

Specifically, the primary offset length L1 and the secondary offset length L2 are determined so that the first angle a2 and the second angle a3 are set within a range of 8 degrees to 20 degrees.

When the primary offset length L1 and the secondary offset length L2 are reduced, the torque of the butterfly valve 100 is reduced. However, even if the primary offset length L1 and the secondary offset length L2 are reduced, the torque of the butterfly valve is not continuously reduced.

Figure 3:
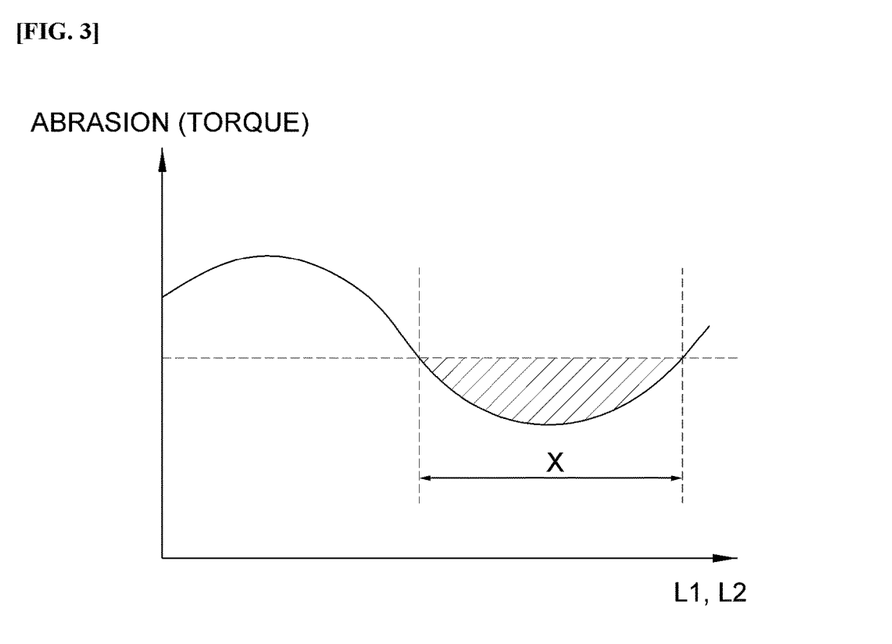
FIG. 3 is a graph illustrating a correlation between a primary offset and a secondary offset and valve torque (abrasion of the disk and the seat).

In accordance with the detailed description, the horizontal axis of the graph in FIG. 3 illustrates the primary offset length L1 and the secondary offset length L2 plotted relative to disk abrasion. In the graph, the primary offset length L1 and the secondary offset length L2 decrease toward the right.

As illustrated in FIG. 3, it can be seen that when the primary offset length L1 and the secondary offset length L2 are gradually reduced, the disk abrasion or the torque of the valve is reduced in a predetermined range X.

However, it can be seen that the abrasion of the disk or the torque of the butterfly valve increases again after the predetermined range X passes. Accordingly, there is a range of the primary offset length L1 and the secondary offset length L2 in which disk abrasion or torque of the butterfly valve is reduced.

Based on this, in the present exemplary embodiment, the first angle a2 and the second angle a3 are determined as the reference for setting the primary offset length L1 and the secondary offset length L2, and the first angle a2 and the second angle a3 are set to be limited to a set range 8 degrees to 20 degrees.

Figure 4:
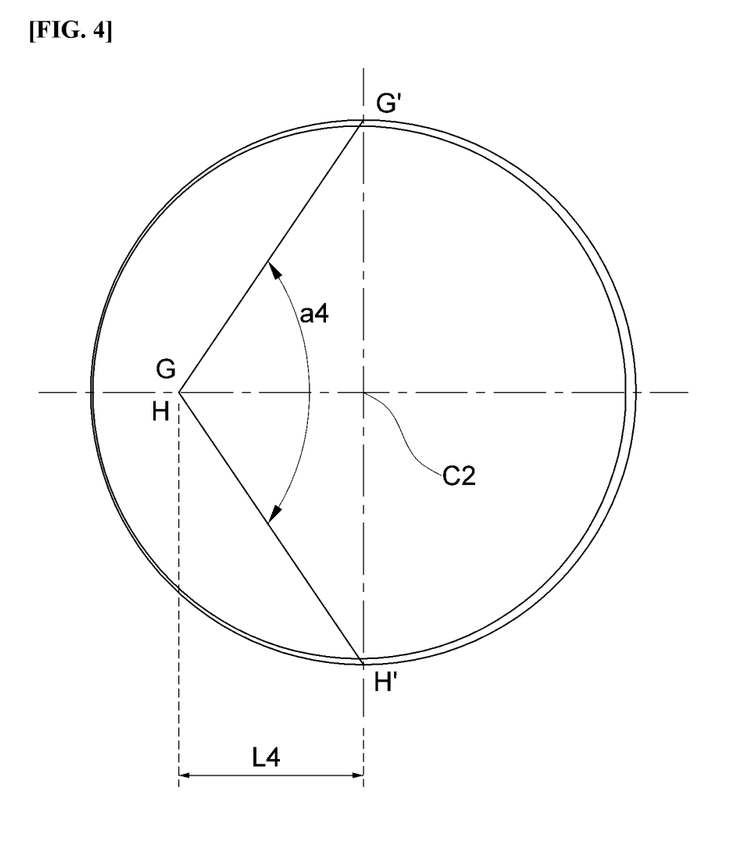
FIG. 4 is a front view of the butterfly valve of the present invention.

FIG. 4 is a front view of the butterfly valve 100 of the present invention.

FIG. 4 illustrates a seventh virtual line G-G' that starts at one point of the cross-section with the largest diameter among the cross-sections of the sealing portion 151b that intersects the longitudinal direction of the flow path and continues to the cross-section with the smallest diameter, and an eighth virtual line H-H' that starts at another point in the cross-section with the largest diameter and continues to the cross-section with the smallest diameter.

Here, the one point is located vertically above the center of the disk body 151, and the other point is located vertically below the center of the disk body 151.

For the disk 150, a point where the seventh virtual line G-G' and the eighth virtual line H-H' intersect is spaced apart by a set distance L4 from the center of the disk body 101 so that a loft angle a4 formed by the intersection of the seventh virtual line G-G' and the eighth virtual line H-H' becomes a set angle. This is called a quaternary offset.

The quaternary offset length L4 is the same as the tertiary offset length L3.

That is, the surface of the disk 150 that is in contact with the seat 130 (the side surface of the sealing portion 151*b*) needs to be formed while satisfying the tertiary and quaternary offset conditions.

Figure 5:
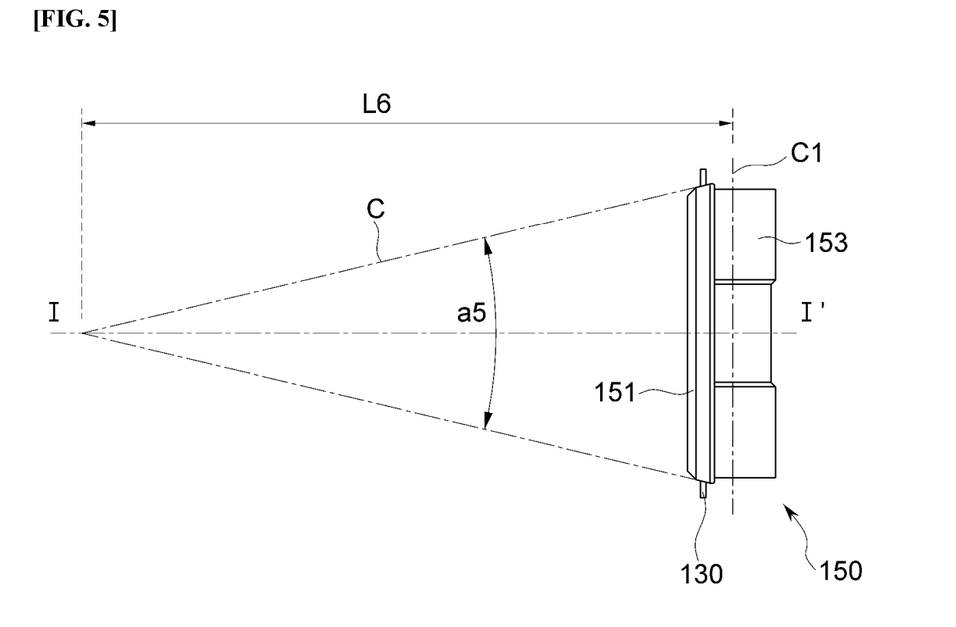
FIG. 5 is a side view of the butterfly valve of the present invention.

FIG. 5 is a side view of the butterfly valve 100 of the present invention.

FIG. 5 illustrates a second virtual cone C extending from the outer surface of the disk body 151.

A vertex of the second virtual cone C is located on a center line I-I' extending along the center of the disk 150.

A cone angle a5 of the second virtual cone C is determined by the quaternary offset.

The disk 150 is manufactured using a 5-axis processing device to satisfy the tertiary and quaternary offset conditions. The 5-axis processing device which makes a jig on which a workpiece to be processed is disposed rotate, and makes a tool for processing the workpiece also rotate.

That is, when the disk 150 is processed by using the 5-axis processing device and when the disk 150 is processed so as to satisfy the tertiary offset condition and the quaternary offset condition, the cone angle a5 of the second virtual cone C is determined. This is called a quintic offset.

Further, a distance L6 from the vertex of the second virtual cone C to the center of the hinge coupling part 153 is the same as the distance L5 from the vertex of the first virtual cone B to the center of the hinge coupling part 153.

In the disk 150 satisfying the conditions of the tertiary offset and the quaternary offset, the surface where the disk 150 and the seat 130 are in contact, that is, the side surface of the sealing portion 151*b*, is formed on the virtual cone B and the second virtual cone C. Further, the disk 150 is formed in a shape of a full circle.

In the case of a conventional butterfly valve, even though the butterfly valve has a multi-offset structure, the multi-offset structure had a tertiary offset structure. In particular, the disk of the butterfly valve having the tertiary offset structure has an oval shape long in the transverse direction, rather than a shape of a full circle.

Due to this, when the disk is closed, the contact area between the disk and the seat increases and the pressure concentration increases. In particular, as the pressure concentration at the left and right points with respect to the center of the disk having the overall shape long in the transverse direction increased, the problem of deformation occurred and the risk of leakage increased.

However, in a butterfly valve according to the present invention, the disk 150 forms the shape of the full circle as described above.

Therefore, when the disk 150 is in a closed state by rotating to close the flow path of the valve body 110, the contact area between the sealing portion 151*b* of the disk body 151 and the seat 130 is minimized, and the contact pressure between the disk 150 and the seat 130 becomes uniform, so that pressure concentration is also reduced.

In addition, there is an effect in that when the disk 150 is opened, the flow rate flowing through the butterfly valve based on the rotated disk 150 is uniform.

In particular, as long as the primary to quintic offset conditions are satisfied, the thickness of the seat may be variably applied, and there is no need to change the design of the disk.

The exemplary embodiments of the present invention have been described with reference to the accompanying drawings, but those skilled in the art will understand that the present disclosure may be implemented in another specific form without changing the technical spirit or an essential feature thereof.

Accordingly, it will be understood that the aforementioned exemplary embodiments are described for illustrative and are not limited in all aspects, and it should be construed that the scope of the present disclosure shall be represented by the claims to be described below, and all of the changes or modified forms induced from the meaning and the scope of the claims, and an equivalent concept thereof are included in the scope of the present invention.

What is claimed is:

1. A butterfly valve having a quintuple offset structure, the butterfly valve comprising:
   a valve body having a flow path formed therein and provided to connect neighboring pipes;
   a seat coupled to an inner surface of the valve body; and
   a disk including a disk body provided to open or close the flow path, and a hinge coupling part formed on one surface of the disk body and coupled with a rotation shaft which hinge-couples the disk body and the valve body so that the disk body is rotatable to the valve body,
   wherein when viewed in a plan view, in the disk, a virtual line A-A' that is parallel to the disk body and crosses a center C1 of the hinge coupling part is spaced apart from a virtual line B-B' crossing a center of a thickness of the disk body by a first set distance L1,
   a virtual line C-C' that is parallel to a direction of the flow path and crosses the center C1 of the hinge coupling part is spaced apart from a virtual line D-D' that is parallel to a direction of the flow path and crosses the center of the disk body by a second set distance L2,
   a first virtual cone vertex extending from an outer surface of the disk body that is in contact with the seat and having a set cone angle a1 is eccentric to a position spaced apart from the virtual line D-D' by a third set distance L3, and
   the first set distance L1 and the second set distance L2 are selected so that a first angle a2 formed between the virtual line A-A' and a virtual line connecting the center C1 of the hinge coupling part and a point at which a diameter of a cross section intersecting a longitudinal direction of the flow path among side surfaces of the disk body is the minimum, and a second angle a3 formed between the virtual line A-A' and a virtual line connecting the center C1 of the hinge coupling part and a point at which a diameter of a cross section intersecting a longitudinal direction of the flow path among side surfaces of the disk body is the maximum, fall within a predetermined range;
   wherein the first set distance L1 and the second set distance L2 are selected such that the first and second angles a2, a3 fall within a range of 8 degrees to 20 degrees.

2. The butterfly valve of claim 1, wherein when viewed from the front, in the disk, a point where virtual lines meet and intersect is spaced apart from a center of a cross-section having the largest diameter by a set distance L4 so that a loft angle a4 formed by the intersection of the virtual lines that intersect the longitudinal direction of the flow path and lead from upper and lower points of a cross-section with the largest diameter to a section with the smallest diameter becomes a set angle.

3. The butterfly valve of claim 2, wherein the distance L3, by which the first virtual cone vertex is spaced apart from the virtual line D-D', is the same as the distance L4, by which the point where the virtual lines forming the loft angle a4 meet and intersect is spaced apart from the center of the cross-section having the largest diameter.

4. The butterfly valve of claim 2, wherein the set cone angle a5 of a second virtual cone is determined by the loft angle a4.

5. A butterfly valve having a quintuple offset structure, the butterfly valve comprising:
- a valve body having a flow path formed therein and provided to connect neighboring pipes;
- a seat coupled to an inner surface of the valve body; and
- a disk including a disk body provided to open or close the flow path, and a hinge coupling part formed on one surface of the disk body and coupled with a rotation shaft which hinge-couples the disk body and the valve body so that the disk body is rotatable to the valve body, wherein when viewed in a plan view, in the disk, a virtual line A-A' that is parallel to the disk body and crosses a center C1 of the hinge coupling part is spaced apart from a virtual line B-B' crossing a center of a thickness of the disk body by a first set distance L1, a virtual line C-C' that is parallel to a direction of the flow path and crosses the center C1 of the hinge coupling part is spaced apart from a virtual line D-D' that is parallel to a direction of the flow path and crosses the center of the disk body by a second set distance L2, a first virtual cone vertex extending from an outer surface of the disk body that is in contact with the seat and having a set cone angle a1 is eccentric to a position spaced apart from the virtual line D-D' by a third set distance L3, and the first set distance L1 and the second set distance L2 are set so that a first angle a2 formed between the virtual line A-A' and a virtual line connecting the center C1 of the hinge coupling part and a point at which a diameter of a cross section intersecting a longitudinal direction of the flow path among side surfaces of the disk body is the minimum and a second angle a3 formed between the virtual line A-A' and a virtual line connecting the center C1 of the hinge coupling part and a point at which a diameter of a cross section intersecting a longitudinal direction of the flow path among side surfaces of the disk body is the maximum are limited to a set range;

wherein when viewed from the front, in the disk, a point where virtual lines meet and intersect is spaced apart from a center of a cross-section having the largest diameter by a set distance L4 so that a loft angle a4 formed by the intersection of the virtual lines that intersect the longitudinal direction of the flow path and lead from upper and lower points of a cross-section with the largest diameter to a section with the smallest diameter becomes a set angle;

wherein when viewed from the side, in the disk, a second virtual cone vertex extending from an outer surface of the disk body and having a set cone angle a5 is located on the same axis as the center of the cross-section having the largest diameter.

6. The butterfly valve of claim 5, wherein a horizontal distance length L5 from the center C1 of the hinge coupling part to the first virtual cone vertex is the same as a horizontal distance length L6 from the center C1 of the hinge coupling part to the second virtual cone vertex.

* * * * *